2,994,340
CHECK VALVE

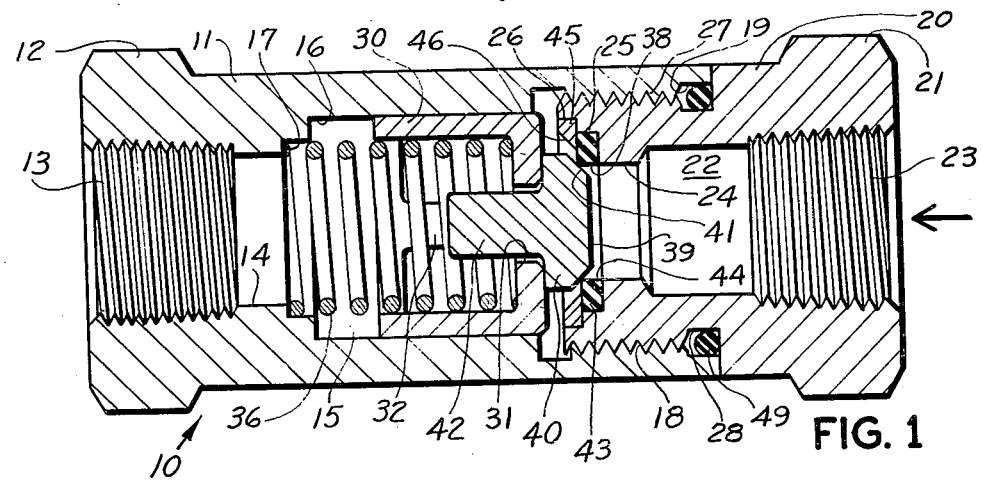
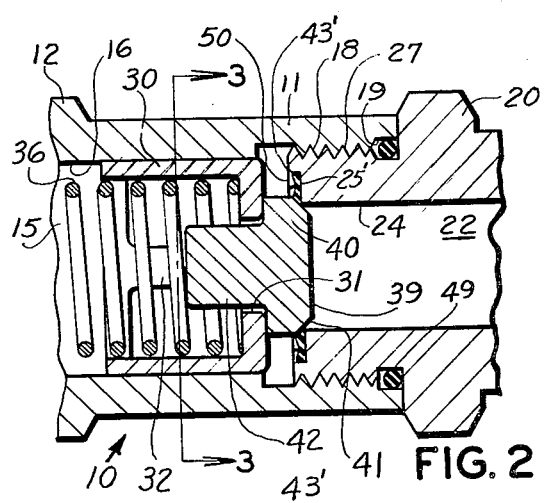
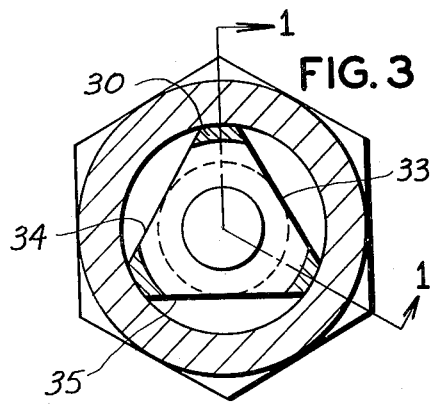
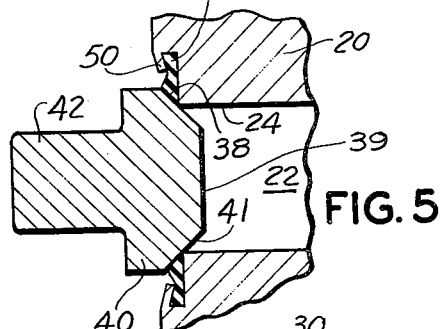
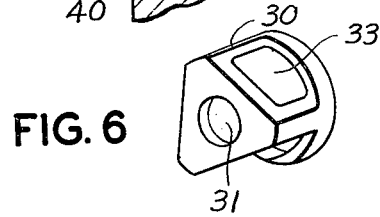
INVENTOR.
STEPHEN J. BIELLO
FRANCIS J. WILSON
BY
William Frederick Werner.
ATTORNEY

Stephen J. Biello, Somerset, Mass., and Francis J. Wilson, Keene, N.H., assignors to Sealol Corporation, Warwick, R.I., a corporation of Delaware
Filed May 14, 1958, Ser. No. 735,206
1 Claim. (Cl. 137—516.29)

This invention relates to check valves and more particularly to a check valve with full operating efficiency at extremely low pressure and through a range of pressures to extremely high pressures.

An object of the present invention is to provide a check valve with a positive leak proof seat at low, medium or high pressure and wherein excess pressure is relieved with a minimum increase in system pressure while providing maximum flow through the valve.

Another object of the present invention is to provide a valve with a wide range of pressure uses which is inexpensive to manufacture and in which the poppet and poppet seat engage with a tighter engagement as the pressure to be maintained becomes higher.

In the past valve and valve seat engaged either in a metal to metal contact or metal to non-metal contact such as an O ring on the valve engaging the metal valve seat. The present invention relates to valves wherein initial valve seating is made on a resilient surface and as the pressure increases on the valve the resilient surface acts as caulking as the valve engages a metal valve seat.

The nub of the present invention is not only a unique rubber seat but a uniquely inexpensive manufacturer's cost in producing the greatly simplified structural members of the valve.

Other objects of the present invention will be pointed out in part and become apparent in part in the following specification and claim.

Referring to the drawings in which similar characters of reference indicate corresponding parts in all the figures.

FIGURE 1 is a longitudinal cross sectional view taken along a line similar to line 1—1 of FIGURE 3 and illustrating the new and improved check valve.

FIGURE 2 is a fragmentary cross sectional view similar to FIGURE 1 showing a modified form of construction for the resilient valve seat.

FIGURE 3 is a vertical cross sectional view taken along line 3—3 of FIGURE 2.

FIGURE 4 is a fragmentary cross sectional view illustrating the initial sealing engagement of the valve with the resilient valve seat when the valve is subjected to extremely low pressure.

FIGURE 5 is a view similar to FIGURE 4 showing the valve and valve seat in metal to metal contact when the valve is subjected to extremely high pressure and the resilient valve seats distorts to assist the fluid sealing of the valve and valve seat.

FIGURE 6 is a perspective view of the cage.

Referring to FIGURE 1 wherein is illustrated the new and improved check valve generally indicated by reference character 10. Valve 10 consists of a main body 11 provided externally with an hexagonal shaped shoulder 12 or other pipe wrench gripping means. Axially, body 11 is provided with a stepped bore consisting of a threaded portion 13, a flow passage 14 or valve size, a chamber 15 having a bearing surface 16, a spring seat 17, a second threaded area 18 and a fluid packing seat 19.

An auxiliary body 20 hexagonal in shape on an enlarged shoulder 21 is provided axially with a stepped bore consisting of a threaded portion 23, a chamber 22, a flow passage 24, a circular recess 25 and a second circular recess 26 larger in diameter than recess 25. A sharp edged valve seat 38 is formed at the juncture of flow passage 24 and circular recess 25.

A cage 30 is slidably mounted in chamber 15 on bearing surface 16 and is provided with a poppet valve sleeve 31 and a spring retaining chamber 32. Cage 30 is triangular in shape throughout the body area to provide a three point contact on bearing surface 16 and three open sides or ports 33, 34, 35 through which the fluid may flow.

A spring 36 is positioned in spring retaining chamber 32 on one end and in spring seat 17 on the other end.

A poppet valve 40 is provided having a valve face 41 and a stem 42. Stem 42 is loosely mounted in sleeve 31. The combination of the cage 30 and poppet valve 40 is termed a piston in the art.

A resilient washer 43 having a flow area 44 is located in circular recess 25. A retaining collar 45 having a beveled surface 46 is secured in circular recess 26 with a drive fit so as to hold resilient washer 43 in circular recess 25.

Auxiliary body 20 on its external diameter is provided with a threaded area 27 and a fluid packing seat 28. Auxiliary body 20 is secured to main body 11 through threaded areas 27 and 18 with a fluid packing 49 located in fluid packing seats 19 and 28.

In operation spring 36 with a predetermined tension yieldingly forces cage 30 and poppet valve 40 toward resilient washer 43 so as to cause valve face 41 to engage resilient washer 43.

The present invention relates to check valves such as are used in pumps having a pressure which starts from zero and which attains a pressure of 3000 p.s.i.

The pumped fluid will flow from right to left FIGURE 1 in the direction of the arrow. The pressure acting on the face 39 of poppet valve 40 must be sufficient to overcome the tension of spring 36 to allow the fluid to flow through valve 10. As the pressure in the pump line drops, back pressure in chamber 15 acting on cage 30 and valve 40, assisted by spring 36, will cause valve face 41 to engage resilient washer 43. Should the back pressure exceed 500 p.s.i. then valve face 41 will compress and distort resilient washer 43 until valve face 41 engages valve seat 38. There is a combination of pressures on the poppet valve 40 and on the resilient washer 43 which causes resilient washer 43 to distort and bind against poppet valve 40. Thereby providing a very tight seal which is assisted by high pressure. Thus providing a metal 38 to metal 41 valve seating which is assisted in fluid tight relationship by resilient washer 43.

Referring to FIGURES 2, 3, 4 and 5 wherein is illustrated a modified form of means for retaining resilient washer 43' in circular groove 25'. The construction and operation of the valve illustrated in FIGURE 1 and the modified form illustrated in FIGURES 2 thru 4 is identical with one exception. Instead of providing a second circular recess 26 and a retaining collar 45, the end 50 of auxiliary body 20 is pressed inwardly to securely hold resilient washer 43' in circular recess 25'.

Having shown and described preferred embodiments of the present invention, by way of example, it should be realized that structural changes could be made and other examples given without departing from either the spirit or scope of this invention.

What we claim is:

A check valve consisting of a main body provided axially with a stepped bore consisting of a threaded portion, a flow passage, a first chamber having a bearing surface, a spring seat, a second threaded area and a fluid packing seat, an auxiliary body provided axially with a stepped bore consisting of a threaded portion, a second chamber, a flow passage, a first circular recess and a second circular recess larger in diameter than said first circular recess, a cage slidably mounted in said first chamber on said bearing surface and provided with a poppet valve sleeve and a spring retaining chamber, said cage being triangular in shape to provide a three point contact on said bearing surface and three open sides through which fluid may flow, a spring positioned in said spring retaining chamber on one end and in said spring seat on the other end, a poppet valve having a valve face and a stem, said stem being loosely mounted in said sleeve, said cage and said poppet valve constituting a piston urged in one direction by said spring, a resilient washer providing a flow area located in said first circular recess, a retaining collar fixed in said second circular recess to hold said resilient washer in said first circular recess, said auxiliary body provided externally with a threaded area and a fluid packing seat, said auxiliary body being removably secured to said main body through the respective threaded areas with a fluid tight packing located in the fluid packing seats of said main body and said auxiliary body, the valve face engaging the seat resilient washer under the influence of said spring, and a sharp edge at the intersection of said first circular recess and said second flow passage constituting a second valve seat, and fluid under pressure passing through said check valve from said auxiliary body to said main body, the fluid pressure acting on said poppet valve to overcome the force of said spring to unseat said poppet valve, and back pressure acting on said cage and poppet valve with the assistance of said spring seating said poppet valve on said resilient washer with increased back pressure forcing said poppet valve face against said second valve seat and distorting said resilient washer into a positive fluid tight sealing element.

References Cited in the file of this patent

UNITED STATES PATENTS

| | | |
|---|---|---|
| 2,348,548 | Koehler | May 9, 1944 |
| 2,440,608 | Hunter | Apr. 27, 1948 |
| 2,521,961 | Bacheller | Sept. 12, 1950 |
| 2,653,792 | Sacchini | Sept. 29, 1953 |
| 2,670,922 | Carlisle | Mar. 2, 1954 |
| 2,673,062 | Cornelius | Mar. 23, 1954 |

FOREIGN PATENTS

| | | |
|---|---|---|
| 1,013,136 | Germany | Aug. 1, 1957 |